(12) United States Patent
Lundstrom

(10) Patent No.: US 7,872,972 B2
(45) Date of Patent: Jan. 18, 2011

(54) METHOD AND APPARATUS FOR IMPROVING SCHEDULING IN PACKET DATA NETWORKS

(75) Inventor: Stig Anders Lundstrom, La Jolla, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 994 days.

(21) Appl. No.: 11/140,385

(22) Filed: May 27, 2005

(65) Prior Publication Data

US 2006/0268713 A1 Nov. 30, 2006

(51) Int. Cl.
*H04J 1/16* (2006.01)

(52) U.S. Cl. ....................................................... 370/235

(58) Field of Classification Search ......... 370/230–235; 270/230–235
See application file for complete search history.

(56) References Cited

U.S. PATENT DOCUMENTS

| | | | |
|---|---|---|---|
| 5,699,519 A * | 12/1997 | Shiobara | 709/235 |
| 5,796,719 A * | 8/1998 | Peris et al. | 370/231 |
| 6,198,725 B1 * | 3/2001 | Constantin et al. | 370/395.21 |
| 6,532,213 B1 * | 3/2003 | Chiussi et al. | 370/230.1 |
| 6,834,053 B1 | 12/2004 | Stacey et al. | |
| 6,879,561 B1 * | 4/2005 | Zhang et al. | 370/235 |
| 7,164,919 B2 * | 1/2007 | Chen | 455/452.2 |
| 2002/0129158 A1 * | 9/2002 | Zhang et al. | 709/234 |
| 2002/0152303 A1 * | 10/2002 | Dispensa | 709/224 |
| 2002/0194342 A1 | 12/2002 | Lu et al. | |
| 2003/0013451 A1 | 1/2003 | Walton | |
| 2003/0185224 A1 * | 10/2003 | Ramanan et al. | 370/412 |
| 2004/0013089 A1 * | 1/2004 | Taneja et al. | 370/235 |
| 2005/0232227 A1 * | 10/2005 | Jorgenson et al. | 370/351 |

FOREIGN PATENT DOCUMENTS

WO 02/091597 A2 11/2002

* cited by examiner

*Primary Examiner*—Kwang B Yao
*Assistant Examiner*—Juvena Loo
(74) *Attorney, Agent, or Firm*—Coats & Bennett, PLLC

(57) ABSTRACT

A method of scheduling packet data delivery by a communication network node uses knowledge of the incoming delays and corresponding delay budgets associated with the packet data to be scheduled. For example, a wireless communication network base station may serve a plurality of users via a time-multiplexed packet data channel, and may schedule the delivery of packet data targeted to individual ones of those users based on determining the allowable scheduling delays for the incoming packet data it receives for those users. The allowable scheduling delays for packet data received on a given data connection may be determined based on the incoming delays associated with that packet data and the corresponding end-to-end delay budget defined for that packet data. The incoming delays may be calculated from packet time information, e.g., timestamps, and/or may be estimated based on call type, network type, network distances/locations, network conditions, etc.

18 Claims, 4 Drawing Sheets

METHOD AND APPARATUS FOR IMPROVING SCHEDULING IN PACKET DATA NETWORKS

BACKGROUND

The present invention generally relates to packet data communication networks, such as wireless communication networks adapted for packet data services, and particularly relates to improving service scheduling in such networks.

Service scheduling plays an increasingly prevalent role in at least some types of packet data networks. For example, wireless communication networks, such as cellular radio networks, commonly use service schedulers on the forward and/or reverse radio links to control the scheduling of data transmissions to selected users or groups of users. In such scenarios, it is common for a radio base station to maintain data queues for incoming packet data targeted for delivery to individual mobile stations, or groups of mobile stations, whose packet data connections with the radio network are being supported by the radio base station.

A service scheduler within the radio base station transmits data from individual queues according to overall service objectives and according to connection-specific service criteria. That is, given ones of the data connections may have specific Quality-of-Service (QoS) and/or Grade-of-Service (GoS) constraints associated with them that require specific consideration by the service scheduler. For example, certain data connections may have minimum or maximum requirements for data rate, packet latency or overall packet delay, packet jitter, etc., that cannot (or should not) be violated by the service scheduler.

In particular, many types of packet data traffic are delay sensitive and have maximum delay budgets associated with them. Video conferencing and voice applications based on packet data protocols represent two types of delay sensitive applications, each associated with specified maximum delay budgets that stipulate the maximum delivery delay that can be tolerated while still maintaining acceptable application performance. For example, the ITU G.114 for voice delay recommends a maximum end-to-end delay of 280 milliseconds (ms) for satisfactory service.

Constrained delay budgets present service schedulers with significant challenges. For example, maximizing aggregate data throughput and/or maximizing the number of users simultaneously supported represent common goals in wireless communication networks. Thus, air interface service schedulers commonly include scheduling functions that tend to give scheduling preference to users in better radio conditions, as those users can be served at higher data rates. Serving users at higher data rates decreases the amount of time needed, serves them via the oftentimes-limited interface resources, and improves the aggregate data throughput of the scheduler.

However, if some of the packet data to be delivered by the scheduler over the air interface has a maximum delay budget associated with it, the scheduler may be forced to schedule such data for delivery, even if the user(s) targeted to receive the data are not in good radio conditions. More particularly, the conventional scheduler does not know how much of the delay budget has already been consumed by the time it receives a given data packet for transmission, and thus it does not know how much delay budget time remains available for scheduling actual delivery of that packet to the targeted user(s) via transmission over the air interface.

SUMMARY OF THE DISCLOSURE

A packet data scheduler and corresponding scheduling methods provide packet data delivery scheduling for incoming (delay sensitive) packet data based on considering the incoming delays of the packet data. Incorporating knowledge of the incoming delays, e.g., the packet ages and/or transit network delays, into the scheduler's operations reduces or eliminates the violation of end-to-end delay budgets, and increases the scheduler's overall capacity for handling such data.

In one embodiment of the packet data scheduling methods taught herein, a network node is adapted to deliver data packets incoming to the network node to targeted ones of a plurality of users at scheduled service intervals. The node includes hardware, software, or some combination thereof, implementing a method of scheduling packet data delivery that is based on determining incoming delays associated with the data packets, and setting scheduling priorities for delivering the data packets as a function of their incoming delays and corresponding delay budgets.

By way of non-limiting example, the network node may comprise a base station configured for use in a wireless communication network, and the packet data may comprise Voice-over-Internet-Protocol (VoIP) data packets, and/or other delay-sensitive types of data packets, incoming on one or more data connections being supported by the base station. By incorporating knowledge of the incoming delays associated with the data packets incoming to the base station, the scheduler operates on the basis that, for a given end-to-end delay budget, the allowable scheduling delay is a function of the time remaining in the data packets' end-to-end delay budget(s). That is, for a given delay budget, packet data having longer incoming delays generally should be scheduled in advance of packet data having shorter incoming delays.

More broadly, whether implemented in a base station of a wireless communication network, a method of scheduling delivery of delay-sensitive packet data incoming to a network node comprises determining incoming delays associated with the packet data and scheduling delivery of the packet data as a function of the incoming delays and corresponding delay budgets. Determining incoming delays associated with the packet data may comprise estimating a network transit time of incoming data packets on one or more data connections being supported by the network node.

The transit time may comprise the overall accumulated delays associated with transmission of the data packets from the originating network, e.g., a data packet "age." The transit time may be calculated dynamically for individual data packets, or groups of packets. The transit times for individual data packets, groups of data packets, or for one or more data connections, may be based on default values, or calculated dynamically. For example, a default transit time estimate may be selected from a set of default transit time estimates. Selecting the default transmit time estimate from the set of default transmit time estimates may be based on one or more variables associated with a given data connection. Such variables may include at least one of an originating network type variable, a call type variable, a network conditions variable, and an originating/terminating network locations variable.

Thus, in the method immediately above, the incoming delay for packet data incoming on a given data connection may be selected as a particular default value based on, for example, the call type and/or originating network type associated with the packet data. Alternatively, the incoming delays may be calculated dynamically for individual data packets, groups of data packets, or given data connections. By way of non-limiting example, the network node, or another entity in the node's network, which may be a terminating or intermediate network, may "ping" the originating network to determine transit times. Pinging may occur once, or may be ongoing, and the transit time may represent the most current pinged value, or may represent an average of multiple pings.

As another example, the incoming delays of packet data may be determined dynamically based on time information included in the packet data, or associated with the packet data. For example, incoming data packets may include time stamp information in them (e.g., time information within their headers), or such information may be available in association with receiving the incoming data packets. RTP (Real-time Transport Protocol and RTCP (Real-time Control Protocol) together stand as examples of real-time transport protocols used to carry and control delay-sensitive packet data, such as VoIP packet data traffic, in packet data networks. These and other internet protocols include provisions to carry absolute packet time stamps or other timing information, or can be adapted to provide such information, for use in determining the accumulated incoming delays at an intermediate or terminating network node.

Of course, the present invention is not limited by the foregoing summary of selected features and advantages. Those skilled in the art will recognize additional features and advantages upon reading the following description, and upon viewing the accompanying drawings.

DESCRIPTION OF EMBODIMENTS OF THE INVENTION

Figure 1:
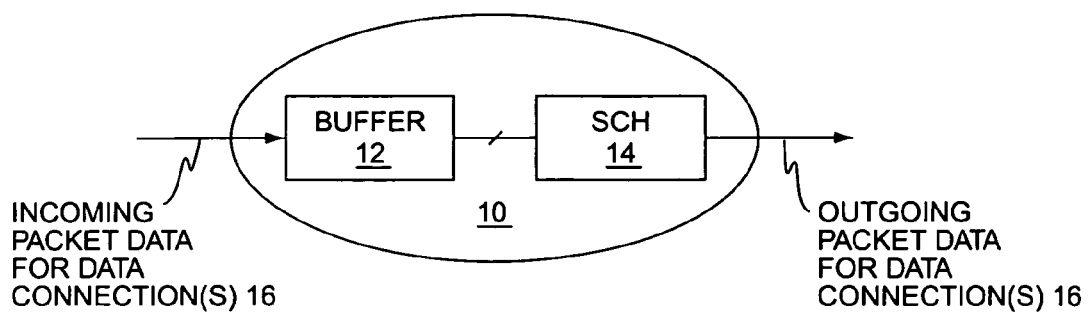
FIG. 1 is a block diagram of a network node that is configured to schedule packet data deliveries based on knowledge of the incoming delays associated with the packet data to be delivered by it.

FIG. 1 illustrates a network node 10, including a buffer 12 and a packet data service scheduler 14. The node 10, which may be an intermediate node or a terminating node, receives incoming packet data for one or more logical data connections 16, and outputs that packet data according to a delivery schedule managed by the scheduler 14. As used herein, the term "logical data connection" generally connotes a given end-to-end data connection, such that the packet data traffic for that end-to-end connection flows through the node 10 as a distinct packet data stream.

Rather than simply pass through incoming packet data as it is received, the scheduler 14 of the node 10 schedules the "delivery" (i.e., output) of the packet data according to a defined scheduling algorithm. As explained later herein, such scheduling may be necessary where the delivery targets are wireless communication terminals having differing service requirements and dynamically changing radio conditions, but it should be understood that the scheduling methods taught herein are not limited to such applications.

Figure 2:
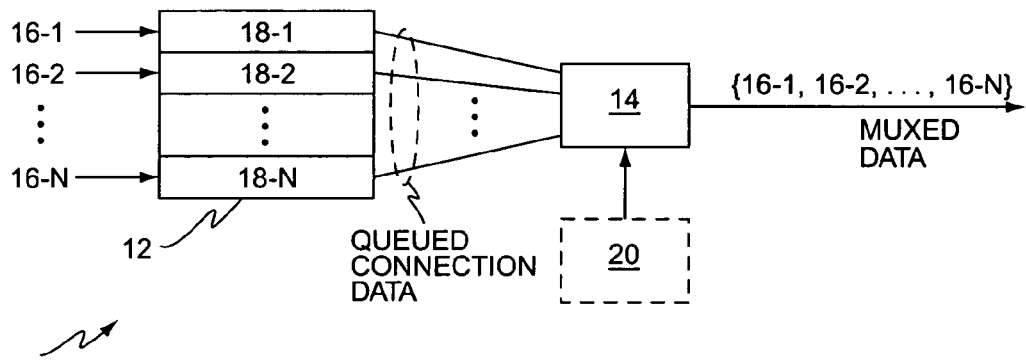
FIG. 2 is a block diagram of more detailed functional circuits for one embodiment of the network node of FIG. 1.

FIG. 2 illustrates one embodiment of the node 10, wherein the scheduler 14 uses packet data delivery scheduling to determine the order of its output multiplexing of packet data flowing on the data connections 16. Such multiplexing may be performed, for example, where the node 10 is configured as a radio base station providing a shared downlink channel. Shared downlink channels support a potentially large number of users at high data rates, and operate according to a Time Division Multiplexing arrangement, wherein the packet data for a plurality of data connections 16 is time-multiplexed onto the channel according to a delivery schedule.

In the illustrated embodiment, the buffer 12 comprises individual data queues 18-1 through 18-N, that queue packet data incoming to the node 10 for each of the logical data connections 16-1 through 16-N. In turn, the scheduler 14 multiplexes data from respective ones of the queues 18 for output from the node 10, according to its scheduling operations, which include consideration of the incoming delays associated with the packet data incoming to the node 10 for the data connections 16. Note that the scheduler 14 may include, or may be associated with, a memory 20 or other storage device, which may be used to store delay information supporting the determination of incoming delays. For example, as described later herein, the memory 20 may be used to store one or more default delay estimates.

Figure 3:
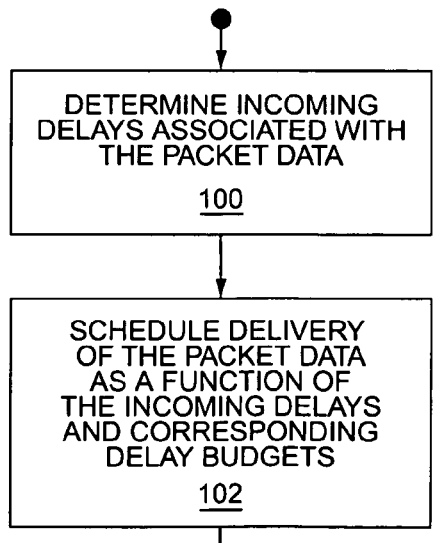
FIG. 3 is a logic flow diagram that may be implemented by the network node of FIG. 1, for example.

Independent of the above implementation details, the node 10 generally is configured to schedule delivery of delay-sensitive packet data incoming to the node 10. To that end, the scheduler 14 may be implemented as one or more processing circuits, comprising hardware, software, or any combination thereof, that are configured according to the processing logic of FIG. 3.

As illustrated, the scheduler 14 determines incoming delays associated with the packet data (Step 100), and schedules delivery of the packet data as a function of the incoming delays and corresponding delay budgets (Step 102). As used herein, the term "delay budget" connotes an end-to-end delay for packet data flowing on a given one of the data connections 16, and it should be understood that different types of packet data generally have different delay budgets.

In one embodiment, the scheduler 14 determines the incoming delays associated with the packet data by estimating a network transit time of incoming data packets on one or more data connections 16 being supported by the node 10, based on a default transit time estimate selected from a set of default transit time estimates. For any given one of the data connections 16, the scheduler 14 may be configured to select the default transit time estimate from the set of default transmit time estimates based on one or more variables associated with the given data connection.

The one or more variables comprise at least one of an originating network type variable, a call type variable, a network conditions variable, and an originating/terminating network locations variable. The originating network type variable may be used to identify the type of network involved in originating the packet data, e.g., the Public Switched Telephone Network (PSTN), a Public Land Mobile (wireless) network, etc. Different network transit delays can be assumed for different network types. Similarly, different transit delays can be assumed for different call types, changing network conditions (high/low call volumes), and for the differing distances/locations involved between the originating network and the network that includes the node 10, which may be a terminating network. The aggregate incoming delay estimated for incoming data packets on individual ones of the data connections 16 may be based on a combination of default assumptions corresponding to network/call type, network conditions, geographic locations, etc.

Regardless of these delay estimation details, the scheduler 14 may be configured generally to schedule delivery of the packet data as a function of the incoming delays and corresponding delay budgets by setting scheduling priorities for delivering the packet data as a function of the incoming delays and the corresponding delay budgets. Setting scheduling priorities for delivering the packet data as a function of the incoming delays and the corresponding delay budgets may comprise setting higher scheduling priorities for higher incoming delays. That is, for two data packets incoming to the scheduler 14 on different ones of the data connections 16, the scheduler 14 may assign a higher scheduling priority (for outgoing packet data delivery) to one of them versus the other, as a function of one of them having a greater incoming delay than the other.

Of course, the prioritization scheduling example is simpler where the two data packets have the same end-to-end delay budget, and a different prioritization method may be used where the delay budgets are different. For example, a more general scheduling method comprises the scheduler 14 determining incoming delays for data packets incoming on one or more data connections being supported by the node 10, and, for each data packet incoming on each data connection, determining an allowable scheduling delay for the data packet as a function of the incoming delay of the data packet and the corresponding delay budget for the data packet. The scheduler 14 can then prioritize its outgoing delivery of data packets on one or more of the data connections 16 being supported by it as a function of the allowable scheduling delays. Data packets having relatively short allowable scheduling delays, i.e., relatively little remaining time in their overall delay budgets, may be given scheduling preference over other data packets having relatively longer allowable scheduling delays, i.e., relatively large amounts of time remaining in their overall delay budgets.

In terms of the scheduler 14 determining the incoming delays, this discussion previously noted that the scheduler 14 can determine incoming delays by estimating them based on default values. Additionally or alternatively, the scheduler 14 can be configured to determine incoming delays for each data packet incoming on each data connection 16 (or for groups of packets incoming on one or more of the data connections 16) by determining a network transit delay experienced by the data packet before its arrival at the network node. In at least one embodiment, network transit delays represent the accumulated transit time for the packet data to travel from their respective originating systems/networks to the node 10. As such, the transit time for a given data packet may be thought of as the packet's age, or thought of as the amount of time out of the packet's overall end-to-end delay budget that is used in getting the packet to the node 10. From that perspective, one sees that the scheduler 14 can set priorities for scheduling packet data deliveries based on determining the remaining times in the delay budget(s) corresponding to the packet data it is scheduling.

That is, the scheduler 14 can be configured to schedule delivery of the packet data as a function of the incoming delays and corresponding delay budgets, such that the combination of incoming delays and any scheduling delays imposed by the node 10 do not exceed the corresponding delay budgets. Thus, the scheduler 14 may determine the network transit delays for data packets incoming to the node 10, and schedule delivery of the packet data by determining allowable scheduling delays for the data packets based on the difference between their network transit delays and corresponding delay budgets and thereby prioritize data packet deliveries based on the allowable scheduling delays.

To better understand how the network and implementation details influence the incoming delays (and, therefore, the allowable scheduling delays), FIGS. 4-9 provide practical illustrations of different types of originating, terminating, and intermediate networks, and illustrate how the incoming delays may vary as a function of different call types and different originating/terminating network types and locations.

Figure 4:
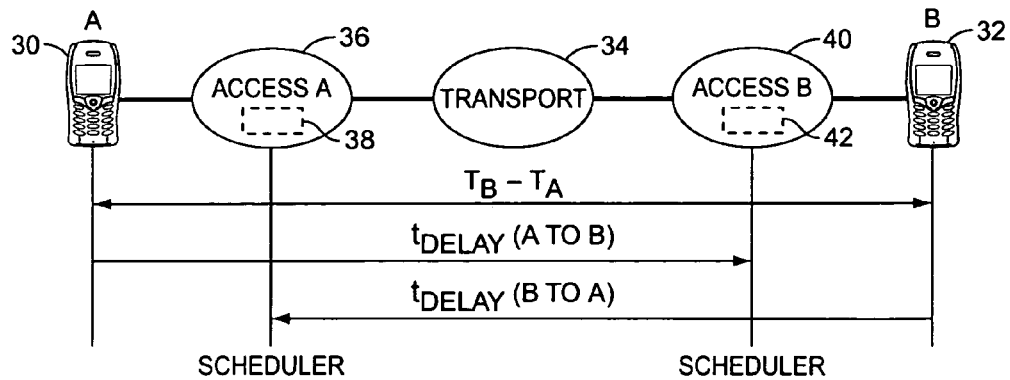
FIG. 4 is a block diagram of a network configuration in which end-to-end delays may be considered in packet data scheduling.

In particular, FIG. 4 illustrates an example of the packet data scheduling methods taught herein, as applied to a Voice-over-Internet-Protocol (VoIP) data connection between a first mobile station 30 and a second mobile station 32. The data connection is supported by a transport network 34, e.g., the Internet, and has an endpoint "A" at the mobile station 30, and an endpoint "B" at the mobile station 32.

In turn, the mobile station 30 is supported by an Access Network (AN) 36, which includes a scheduler 38 that may be configured the same as, or similar to, the previously described scheduler 14. That is, the scheduler 38 may be configured to schedule the delivery of packet data incoming to the AN 36 for delivery to the mobile station 30 and any other devices or systems supported by the AN 36. Similarly, the mobile station 32 is supported by the AN 40, which also may have a scheduler 42 that is the same or similar to the scheduler 38.

With the above configuration, the data connection extends between the mobile stations 30 and 32, and is supported by the AN 36 and the AN 40, with the two ANs 36 and 40 being communicatively coupled together via the transport network 34. Assuming that the users of mobile stations 30 and 32 are engaged in a voice call that is carried via VoIP packet data transmission, it may be seen that data packets originating from the AN 36 are incoming to the scheduler 42 of the AN 40 for delivery to the mobile station 32. Conversely, data packets originating from the AN 40 are incoming to the scheduler 38 of the AN 36 for delivery to the mobile station 30.

With the above arrangement, one sees that, for the scheduler 38 of the AN 36, the incoming delay for packet data originating from the mobile station 32 is $t_{delay}$(B-to-A). Conversely, for the scheduler 42 of the AN 40, the incoming delay for packet data originating from the mobile station 30 is $t_{delay}$ (A-to-B).

The ANs 36 and 40 each may be wireless communication networks. For example, one or both of the ANs 36 and 40 may operate according to cdma2000 standards (e.g., 1xEV-DV), 1xEV-DO standards, or Wideband CDMA (W-CDMA) standards. One characteristic of all such networks is the use of Time-Division-Multiplexing to increase carrier capacity. For example, the W-CDMA standards define a High Speed Downlink Packet Access (HSDPA) channel that is time-shared by a potentially large number of users. Note that recent literature sometimes refers to the HSDPA channel as the High Speed Downlink Shared Channel (HS-DSCH).

Assuming that the ANs 36 and 40 provide delay-sensitive packet data service using TDM-based downlink channels—i.e., channels carrying Time Division Multiplexed data—it will be understood that the scheduler 38 of the AN 36 may be configured to schedule packet data incoming to it from the transport network 34 for scheduled transmission on a TDM-based air interface channel. The scheduler 42 of the AN 40 may be similarly configured for scheduling TDM-based over-the-air delivery of packet data incoming to it from the transport network 34.

In any case, assuming that the ANs 36 and 40 are tasked with delivering delay-sensitive packet data over TDM-based downlink channels, it will be appreciated that the scheduling methods taught herein use the allowed end-to-end delay budget(s) corresponding to that delay-sensitive packet data in a manner that optimizes (or at least increases) system capacity. Broadly, for downlink packet data traffic being transmitted by the AN 36 (or AN 40) on a TDM-based air interface channel, the greater the scheduling delay that can be tolerated, the greater is the scheduling flexibility. Therefore, since the scheduling methods taught herein provide the scheduler 38 (or scheduler 42) with knowledge of the incoming delays of packet data, scheduling can be based on the time remaining in the end-to-end delay budget(s) defined for that packet data traffic.

When looking at an overall delay budget in the context of FIG. 4, one sees that the delay budget limits the amount of time allowed for delivering data between endpoints A and B of the data connection linking mobile stations 30 and 32. The variance of time taken for a data packet originating from endpoint A and traveling to endpoint B, for delivery to the mobile station 32 varies considerably, and can be as little as several milliseconds, to as much as several hundred milliseconds. For reference, the relevant standards recommend a maximum mouth-to-ear delay for Voice using VoIP data packets or other bearer of 280 milliseconds. In any case, it should be appreciated that the delay budgets and incoming delays can vary for different call types, as well as for different terminating and originating network locations, different access network types, different access, originating, or terminating network conditions, and other factors.

Figure 5:
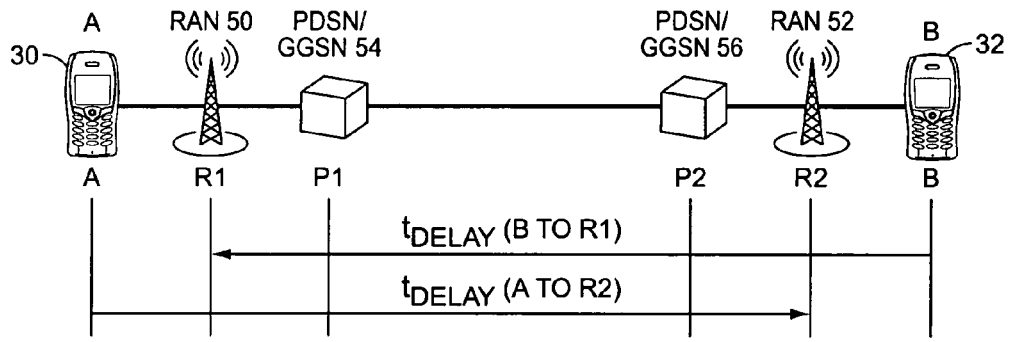
FIG. 5 is another block diagram of a network configuration in which end-to-end delays may be considered in packet data scheduling.

To further explore such variations, FIG. 5 illustrates network configurations similar to those shown in FIG. 4, but explicitly illustrates first and second Radio Access Networks (RANs) 50 and 52, also labeled as "R1" and "R2," respectively, and first and second Packet Data Serving Nodes (PDSNs) or Gateway GPRS Support Nodes (GGSNs) 54 and 56, also labeled as "P1" and "P2," respectively. The RAN 50 and the PDSN/GGSN 54 support transmission of packet data to and from the mobile station 30 and, likewise, the RAN 52 and the PDSN/GGSN 56 support the mobile station 32.

Figure 6:
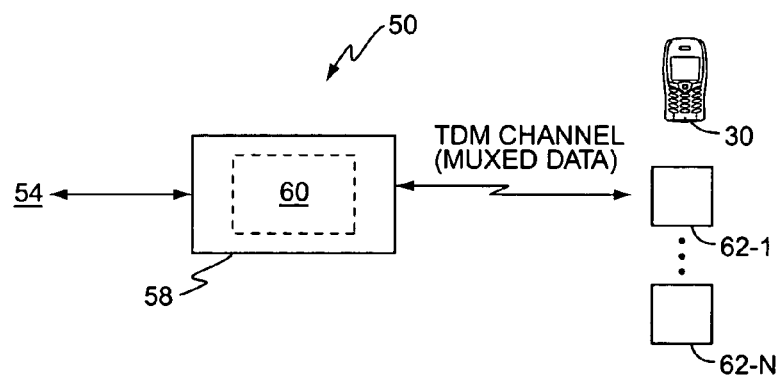
FIG. 6 is a block diagram of a wireless communication network base station, which includes a shared-channel scheduler that incorporates knowledge of incoming delays in its packet data scheduling operations.

Both the RAN 50 and the RAN 52 generally comprise one or more radio base stations, or other wireless access points. By way of non-limiting example, FIG. 6 illustrates that RAN 50 may comprise a base station 58, that includes a scheduler 60, which may be configured according to the scheduling method(s) taught herein. (Note that RAN 52 may be similarly configured.) As such, the scheduler 60 may schedule packet data for transmission on a HS-DSCH or other TDM-based channel being transmitted from the base station 58 based on determining the incoming delays of that packet data. That is, the scheduler 60 may optimize or otherwise improve its packet data scheduling of the packet data to be transmitted to the mobile station 30, and to any number of additional mobile stations 62-1 through 62-N, by determining the allowable scheduling delays for the delay-sensitive packet data incoming to the base station 58.

For example, the scheduler 60 may be programmed to "steal from the rich," wherein it allows longer scheduling delays for packet data having relatively large amounts of time remaining in their delay budgets (i.e., packet data having small incoming delays as compared to the overall delay budget allowed for that packet data). By allowing longer scheduling delays for such packet data, the scheduler 60 has more flexibility in quickly scheduling the delivery of packet data that arrives at the base station 58 with little time remaining in the delay budget(s) defined for such packet data. That is, the scheduler 60 may be programmed to borrow scheduling time/opportunities from packet data that can afford to wait for scheduled transmission, and use the borrowed time/opportunities to provide quick scheduling for packet data that cannot afford to wait Referring again to FIG. 5, the delays from A to B can be different than the delays from B to A, and the scheduler in R1 should be made aware of the delay $t_{delay}$ (B-to-A), while the scheduler in R2 should be made aware of the delay $t_{delay}$ (A-to-B). Such knowledge may be based on estimating delays using default information stored in the RANs, or may be based on dynamic determinations done on a per-packet basis, a per-call/connection basis, or performed for groups of packets and/or groups of data connections.

Figure 7:
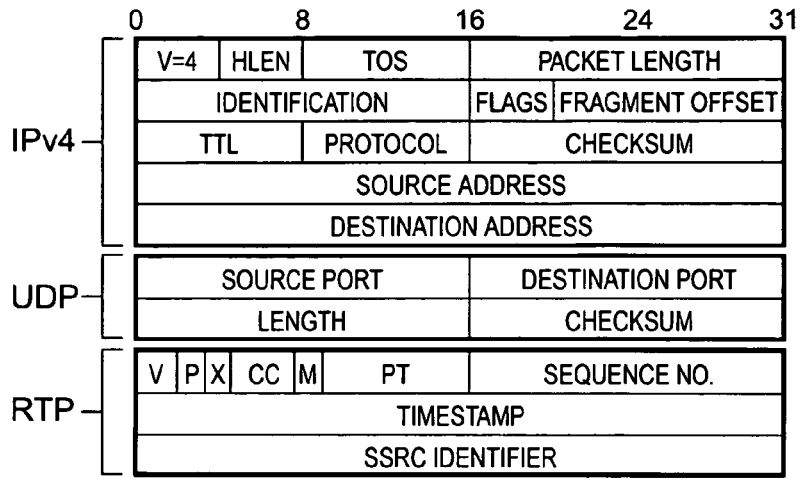
FIG. 7 is a diagram of timestamp information that can be included in RTP/UDP/IPv4 packet data information.

One method is based on using timestamps or other timing information that is included in, or associated with, the incoming packet data. FIG. 7 illustrates one embodiment of timestamp-based incoming delay determination, wherein packet and header information is illustrated for RTP/UDP/IPv4.

More particularly, assuming that the packet data traffic between endpoints A and B (of FIG. 5, for example) comprises VoIP traffic based on the exchange of RTP packets, then R1 and/or P1 can extract timestamp information in either RTP or RTCP for data packets outgoing from endpoint B to endpoint A. Likewise, R2 and/or P2 can extract timestamp information in the data packets outgoing from endpoint A to endpoint B.

Such timestamp information may comprise a relative time or an absolute time. In any case, the scheduler of R1 at endpoint A can inspect the timestamps of RTP packets incoming from endpoint B to determine an elapsed time representing the network transit delays for those incoming data packets. The scheduler of R2 at endpoint B likewise can inspect the timestamps of the RTP packets incoming from endpoint A to determine the incoming delays of those data packets. As an alternative to placing absolute timestamp information in each RTP or RTCP packet, the method may be modified by the introduction of a preamble packet to the RTP flow that includes an absolute time stamp for reference, such that relative timestamps may be included in the subsequent RTP packets.

As an alternative to timestamp-based incoming delay determination, the schedulers of R1 and/or R2 can be configured to initiate a "pinging" process, wherein the relevant A-R2 and/or B-R1 transit times can be discerned by timing a query/response message exchange between the two endpoints. Pinging may be done once for a given data connection, such that the incoming delays assumed for the packet data incoming on that data connection are based on that initial ping (or an average of multiple pings). Alternatively, pinging may be done on an ongoing basis for a given data connection. Refreshing the incoming delay estimate using subsequent pings performed while the packet data connection is active may be useful as a means of "capturing" the affects of changing network conditions. That is, the network transit delays may change over time, and performing subsequent pings provides visibility into such changes.

Figure 8:
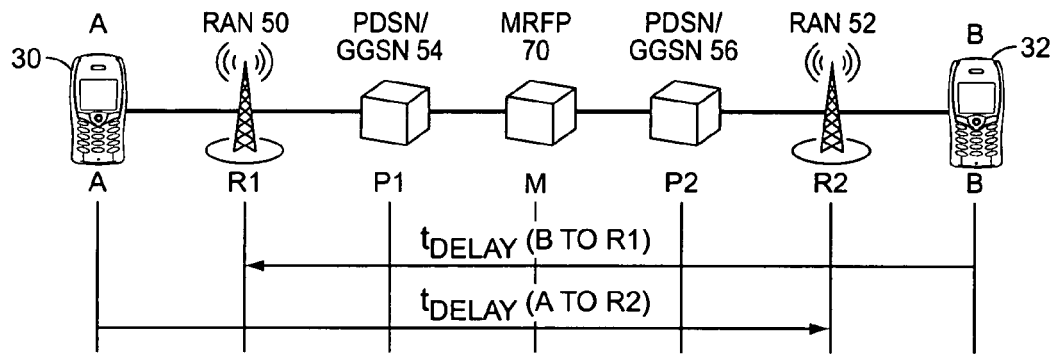
FIG. 8 is another block diagram of a network configuration in which end-to-end delays may be considered in packet data scheduling.

Those skilled in the art will appreciate that accounting for incoming delays at either or both ends of a packet data connection is a matter of the particular access and transport network configurations involved. For example, for packet data associated with communication between mobile stations 30 and 32, FIG. 8 illustrates that the incoming delay for packet data received at R1 can be expressed as $t_{delay}$ (B-to-R1). Similarly, the incoming delay for packet data received at R2 can be expressed as $t_{delay}$ (A-to-R2). Because of the network symmetry, the A-to-B and B-to-A incoming delay calculations span like network entities, but the delays still may be different for the A-B direction than for the B-A direction.

FIG. 8 also illustrates the use of a Media Resource Function Processor (MRFP) 70. The MRFP 70 may be used to support the transmission of delay-sensitive packet data for a variety of call types, including the previously mentioned VoIP calls, and for "live" videoconferencing calls (e.g., H.323 or SIP based conferencing), and other real-time packet data streams. Regardless, with this configuration, RTP is used for each half or leg of the call between mobile stations 30 and 32. That is, RTP is used between P1 and the MRFP 70 for packet data traffic outgoing from endpoint A toward endpoint B, and RTP is used for sending that traffic on from the MFRP 70 toward endpoint B. A similar flow applies to traffic flowing from endpoint B toward endpoint A.

To provide the scheduler of R1 with information about the total incoming delay for packet data originating from endpoint B, the MRFP 70 can be configured to use its internal timer to determine the time elapsed during the transit of packet data from endpoint B to the MRFP 70, and then use that information to recreate the absolute timestamp information originally embedded in the packet information as it was outgoing from endpoint B. Thus, the incoming packet data received at R1 from endpoint B has absolute timestamp information that can be used to calculate the total delay, $t_{delay}$ (B-to-R1). The same method can be used in the opposite direction for packet data flowing from endpoint A to endpoint B, so that the scheduler in R2 can base its scheduling on the total incoming delay of packet data originating from endpoint A.

Figure 9:
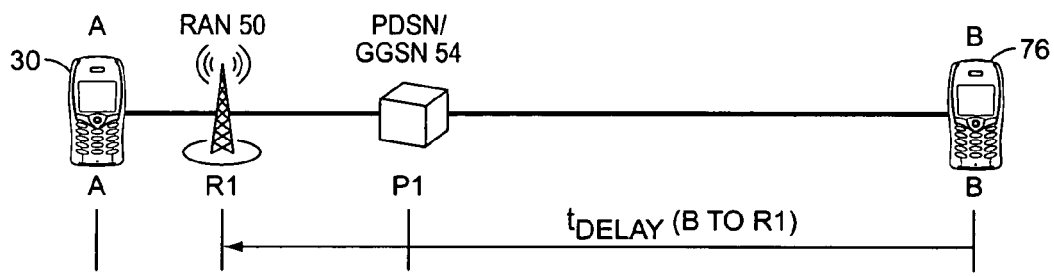
FIG. 9 is another block diagram of a network configuration in which end-to-end delays may be considered in packet data scheduling.

FIG. 9 illustrates a different and simpler network configuration that corresponds, for example, to a mobile-to-land VoIP call. One sees that scheduling as taught herein is practiced at endpoint A for the packet data traffic incoming to RI from endpoint B to schedule the transmission of such data to the mobile station 30 via a shared link, but no such scheduling is needed (or used) at endpoint B. Scheduling is not needed at endpoint B in the illustrated network configuration, because endpoint B corresponds to a landline or other network connection that provides a non-scheduled service channel for the communication terminal 76 at endpoint B.

Figure 10:
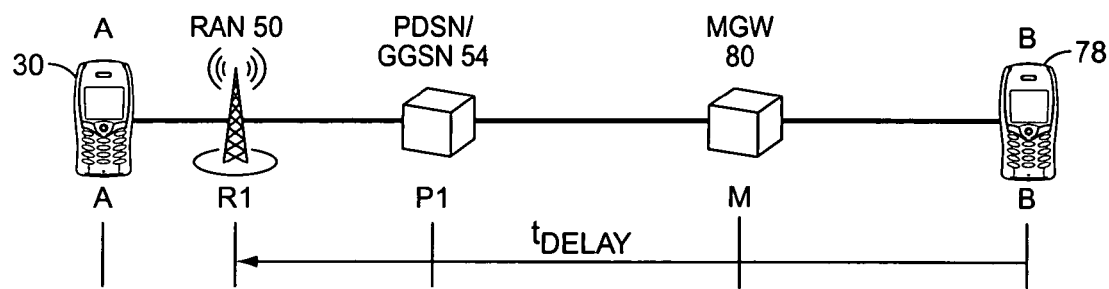
FIG. 10 is another block diagram of a network configuration in which end-to-end delays may be considered in packet data scheduling.

Continuing with the examples, FIG. 10 illustrates a network configuration corresponding to a call between the mobile station 30, which is configured as a VoIP terminal, and the communication device 78, which may be a PSTN telephone, or other type of landline circuit-switched communication device. For the scheduled delivery of packet data incoming to R1 from endpoint B, the incoming delay of interest, $t_{delay}$ (B-to-R1), spans the networks and connections from the device 78 at endpoint B, up to R1. Determining such delays may comprise a combination of calculation and estimation. For example, the delay from the Media Gateway (MGW) 80 to R1 may be calculated as an elapsed time based on timestamp information, while the preceding delay from the device 78 (and its corresponding circuit-switched supporting network) to the MGW 80 may be estimated. The total incoming delay to be considered by R1 in scheduling packet data delivery to the mobile station 30 would thus comprise a calculated portion and an estimated portion.

In estimating delays, one may consider the network type, e.g., a default delay value may be assumed for PSTN calls, and one may consider the relative locations or distances involved between the endpoints A and B, or at least between the endpoint B and the MGW 80. Thus, a default delay assumption for a given type of network may be increased for long separation distances, or complex network arrangements (e.g., satellite hops, transcoding stations, etc.), or may be decreased for short separation distances, and simple network arrangements.

The information supporting these flexible and informed estimation techniques may be programmed into a memory or other storage device for use by the scheduler, and thus represent provisioning information that could be included in a base station, for example. When a given data connection is setup at the base station, identifying information regarding the calling party and the calling and intermediate network types, locations, etc., can be used to index into the stored information for selection of the appropriate default assumptions.

It should be understood that estimation, calculation, and combinations of estimation and calculation can be used for any of the embodiments described herein, although there may be advantages to performing "live" calculations of incoming delay, based on packet timing information or active pinging. In particular, there may be advantages to maintaining dynamically calculated incoming delay values for the data packets flowing on individual data connections, since those values arguably provide the greatest opportunity for aggressively scheduling packet data deliveries based on actual knowledge of the allowable scheduling delays for individual data packets or groups of packets.

Regardless of the particular methods adopted for a given implementation of the scheduling methods taught herein, it should be understood that the present invention is not limited by the foregoing discussion, or by the accompanying drawings. Indeed, the present invention is limited only by the following claims and their legal equivalents.

What is claimed is:

1. A method of scheduling delivery of delay-sensitive packet data from a wireless access point in a radio access network to wireless communication terminals supported by the wireless access point, the method comprising:
   receiving packet data at the wireless access point for a number of data connections supported by the wireless access point, wherein the packet data received for each data connection targets a corresponding one or ones of the wireless communication terminals supported by the wireless access point;
   determining a network transit time for the packet data received for each data connection, wherein the network transit time comprises a cumulative network transit delay experienced by the packet data in transiting from a corresponding originating network to the wireless access point;
   determining a remaining time for delivery for the packet data received for each data connection, wherein the remaining time for delivery comprises the difference between an end-to-end delay budget defined for the packet data and the corresponding network transit time determined for the packet data; and
   scheduling air interface transmissions of the packet data for each data connection as a function of the remaining times for delivery and radio conditions associated with the targeted ones of the wireless communication terminals.

2. The method of claim 1, wherein said step of determining the network transit times comprises, for each data connection, pinging the corresponding originating network to determine the network transit time.

3. The method of claim 2, wherein, for each data connection, said pinging comprises dynamically pinging the originating network and determining the network transit time as the average result of said dynamically pinging.

4. The method of claim 1, wherein said step of determining the network transit times comprises, for each data connection, evaluating packet headers to determine overall elapsed time associated with transit of the packet data from the originating network to the wireless access point.

5. The method of claim 1, wherein said step of determining the network transit times comprises, for the packet data received for a given data connection, storing assumed network transit times and selecting one or more of the stored network transit times as the determined network transit time for the given data connection, based on identifying information regarding one or more of: a calling party identity, calling or intermediate network identities, calling or intermediate network locations or separation distances, and calling or intermediate network types or complexities.

6. The method of claim 1, wherein said step of determining network transit times comprises, for the packet data received for a given data connection, computing the network transit time as the sum of an assumed transit delay representing a portion of the network transit delay experienced by the packet data before its arrival at the wireless access point, and a calculated elapsed time representing the remaining portion of the network transit delay.

7. The method of claim 1, wherein determining the end-to-end delay budget for the packet data received for a given data connection comprises selecting a predefined end-to-end delay budget value based on the type of packet data being carried on the given data connection.

8. The method of claim 1, wherein said step of scheduling comprises preferentially scheduling transmission of packet data having smaller remaining times for delivery, in combination with preferentially scheduling transmission of packet data targeted to wireless communication terminals having better radio conditions.

9. The method of claim 1, wherein said step of scheduling comprises preferentially scheduling transmissions of packet data targeted to those wireless communication terminals having better radio conditions, while also limiting transmission scheduling delays within the wireless access point to avoid violating any of the end-to-end budget delays.

10. A wireless access point configured to schedule delivery of delay-sensitive packet data from the wireless access point to wireless communication terminals supported by the wireless access point, said wireless access point comprising one or more processing circuits configured to:

receive packet data at the wireless access point for a number of data connections supported by the wireless access point, wherein the packet data received for each data connection targets a corresponding one or ones of the wireless communication terminals supported by the wireless access point;

determine a network transit time for the packet data received for each data connection, wherein the network transit time comprises a cumulative network transit delay experienced by the packet data in transiting from a corresponding originating network to the wireless access point;

determine a remaining time for delivery for the packet data received for each data connection, wherein the remaining time for delivery comprises the difference between an end-to-end delay budget defined for the packet data and the corresponding network transit time determined for the packet data; and schedule air interface transmissions of the packet data for each data connection as a function of the remaining times for delivery and radio conditions associated with the targeted ones of the wireless communication terminals.

11. The wireless access point of claim 10, wherein the one or more processing circuits are configured to determine the network transit time for the packet data received for each data connection by pinging the corresponding originating network to determine the network transit time.

12. The wireless access point of claim 11, wherein the one or more processing circuits are configured to dynamically ping the originating network and determine the network transit time as the average result of said dynamically pinging.

13. The wireless access point of claim 10, wherein the one or more processing circuits are configured to determine the network transit time for the packet data received for each data connection by evaluating packet headers to determine overall elapsed time associated with transit of the packet data for that data connection from the originating network to the wireless access point.

14. The wireless access point of claim 10, wherein the one or more processing circuits are configured to determine the network transit time for the packet data received for each data connection based on the wireless access point storing assumed network transit times and the one or more processing circuits selecting a stored network transit time as the determined network transit time, said one or more processing circuits being configured to perform said selecting based on identifying information regarding one or more of: a calling party identity, calling or intermediate network identities, calling or intermediate network locations or separation distances, and calling or intermediate network types or complexities.

15. The wireless access point of claim 10, wherein the one or more processing circuits are configured to determine the network transit time for the packet data received for each data connection based on computing the network transit time as the sum of an assumed transit delay representing a portion of the network transit delay experienced by the packet data before its arrival at the wireless access point, and a calculated elapsed time representing the remaining portion of the network transit delay.

16. The wireless access point of claim 10, wherein the one or more processing circuits are configured to determine the end-to-end delay budget for the packet data received for a given data connection based on selecting a predefined end-to-end delay budget value according to the type of packet data being carried on the given data connection.

17. The wireless access point of claim 10, wherein the one or more processing circuits are configured to schedule the air interface transmissions based on preferentially scheduling transmission of packet data having smaller remaining times for delivery, in combination with preferentially scheduling transmission of packet data targeted to wireless communication terminals having better radio conditions.

18. The wireless access point of claim 10, wherein the one or more processing circuits are configured to schedule the air interface transmissions based on preferentially scheduling transmissions of packet data targeted to those wireless communication terminals having better radio conditions, while also limiting transmission scheduling delays within the wireless access point to avoid violating any of the end-to-end budget delays.

* * * * *

UNITED STATES PATENT AND TRADEMARK OFFICE
CERTIFICATE OF CORRECTION

| | | |
|---|---|---|
| PATENT NO. | : 7,872,972 B2 | Page 1 of 1 |
| APPLICATION NO. | : 11/140385 | |
| DATED | : January 18, 2011 | |
| INVENTOR(S) | : Lundstrom | |

It is certified that error appears in the above-identified patent and that said Letters Patent is hereby corrected as shown below:

In Column 3, Line 63, delete "DESCRIPTION" and insert -- DETAILED DESCRIPTION --, therefor.

In Column 8, Line 18, delete "wait" and insert -- wait. --, therefor.

In Column 9, Line 26, delete "MFRP 70" and insert -- MRFP 70 --, therefor.

In Column 9, Line 47, delete "RI" and insert -- R1 --, therefor.

Signed and Sealed this
Ninth Day of August, 2011

David J. Kappos
*Director of the United States Patent and Trademark Office*